(12) United States Patent
Xie et al.

(10) Patent No.: US 8,767,357 B2
(45) Date of Patent: Jul. 1, 2014

(54) OVERVOLTAGE PROTECTION SYSTEM FOR POWER SYSTEM WITH MULTIPLE PARALLEL-CONNECTED SWITCHING POWER SUPPLIES

(75) Inventors: Renjian Xie, Shenzhen (CN); Yingyang Ou, Shenzhen (CN); Huailiang Sheng, Shanghai (CN); Qingyi Huang, Shenzhen (CN)

(73) Assignee: Analog Devices, Inc., Norwood, MA (US)

( * ) Notice: Subject to any disclaimer, the term of this patent is extended or adjusted under 35 U.S.C. 154(b) by 182 days.

(21) Appl. No.: 13/523,622

(22) Filed: Jun. 14, 2012

(65) Prior Publication Data

US 2013/0335862 A1    Dec. 19, 2013

(51) Int. Cl.
*H02H 9/00*    (2006.01)
*H02H 3/20*    (2006.01)

(52) U.S. Cl.
USPC .................................. 361/18; 361/80; 361/56

(58) Field of Classification Search
CPC .................................. H02H 9/00; H02H 3/20
USPC .......................................... 361/56, 57, 90, 18
See application file for complete search history.

(56) References Cited

U.S. PATENT DOCUMENTS

| | | | |
|---|---|---|---|
| 5,559,376 A * | 9/1996 | Tachikawa | 307/86 |
| 6,031,743 A | 2/2000 | Carpenter et al. | |
| 6,121,759 A * | 9/2000 | Uusitalo | 323/272 |
| 6,278,597 B1 | 8/2001 | Covi et al. | |
| 6,301,133 B1 * | 10/2001 | Cuadra et al. | 363/65 |
| 6,664,660 B2 | 12/2003 | Tsai | |
| 6,670,793 B1 * | 12/2003 | Cornick et al. | 323/207 |
| 7,113,379 B2 * | 9/2006 | Matsumoto | 361/57 |
| 7,298,601 B2 * | 11/2007 | Covi et al. | 361/56 |
| 7,649,404 B2 * | 1/2010 | Sikora et al. | 327/541 |
| 7,787,222 B2 | 8/2010 | Covi et al. | |
| 8,049,368 B2 * | 11/2011 | Miyazaki et al. | 307/70 |
| 2007/0035899 A1 * | 2/2007 | Covi et al. | 361/56 |

* cited by examiner

*Primary Examiner* — Rexford Barnie
*Assistant Examiner* — Angela Brooks
(74) *Attorney, Agent, or Firm* — Schwegman Lundberg & Woessner, P.A.

(57) ABSTRACT

An OVP system which includes a plurality of OVP circuits coupled to respective parallel-connected switching power supplies. Each OVP circuit comprises a bus voltage overvoltage detection circuit having a first output which toggles when the voltage on the common power bus exceeds a reference voltage, a modulation flag detection circuit which receives a value that varies with a parameter associated with the PWM or PFM drive signals generated for the switching power supply to which the OVP circuit is coupled and has a second output which toggles when the parameter value exceeds a reference parameter value, logic circuitry which toggles an output when both the first and second outputs toggle, and an overvoltage response circuit which initiates a course of action such as latching or shutting down the switching power supply to which the OVP circuit is coupled when the logic circuitry's output toggles.

31 Claims, 3 Drawing Sheets

OVERVOLTAGE PROTECTION SYSTEM FOR POWER SYSTEM WITH MULTIPLE PARALLEL-CONNECTED SWITCHING POWER SUPPLIES

BACKGROUND OF THE INVENTION

1. Field of the Invention

This invention relates generally to overvoltage protection (OVP) circuits for switching power supplies, and more particularly to OVP circuits for multiple parallel-connected switching power supplies.

2. Description of the Related Art

Some power systems employ multiple switching power supplies, the outputs of which are connected to a common bus. Such an arrangement may be used to provide a larger power output through current sharing, or to maintain the availability of the bus voltage in the event that one or more of the contributing power supplies fails. Generally, an OR-ing circuit is used to protect against power flow into each power supply from other power supplies; this ensures that power flows only out of each power supply and that the power supplies can be hot-swapped.

To improve the overall efficiency of such power systems and to reduce the overall cost, it is becoming popular to connect the power supplies directly to the common bus without the use of an OR-ing circuit. An example of such an arrangement is shown in FIG. 1. The power supplies (10, 12, 14) receive a common DC voltage at respective inputs and produce respective output voltages which are connected together to provide the system's output voltage Vo at common voltage bus 15. Overvoltage protection (OVP) circuits (16, 18) would typically be arranged to receive the common bus voltage at respective inputs (20, 22) and to provide one or more control signals (24, 26) to a respective power supply which are arranged to disable the power supply if the bus voltage exceeds a predetermined limit.

However, with no OR-ing circuits, an overvoltage condition due to one faulty power supply raises the common bus voltage, which may trigger the activation of the OVP circuits of the other power supplies connected to the bus. This may result in all of the power supplies becoming disabled, and the common bus to fail.

SUMMARY OF THE INVENTION

The present invention is directed to an OVP system for a power system which includes multiple switching power supplies having their output voltages connected to a common power bus. The OVP system maintains the availability of the bus voltage in the event of the failure of one of the power supplies, without the use of OR-ing circuits.

The present OVP system includes a plurality of OVP circuits adapted for coupling to respective parallel-connected switching power supplies, each of which has one or more switching elements that are driven with respective pulse-width-modulated (PWM) or pulse-frequency-modulated (PFM) drive signals generated by a control circuit which varies the drive signals as needed to regulate an output voltage; the output voltages are connected to a common power bus. Each OVP circuit comprises:

a bus voltage overvoltage detection circuit having an output which toggles when the voltage on the common power bus exceeds a predetermined reference voltage;

a modulation flag detection circuit which receives a value that varies with a parameter associated with the PWM or PFM drive signals generated for the switching power supply to which the OVP circuit is coupled, and has an output which toggles when the parameter value exceeds a predetermined reference parameter value;

logic circuitry which receives the outputs of the bus voltage overvoltage detection circuit and the modulation flag detection circuit at respective inputs and is arranged to toggle a first output when the output of the bus voltage overvoltage detection circuit indicates that the voltage on the common power bus exceeds the predetermined reference voltage and the output of the modulation flag detection circuit indicates that the parameter value exceeds the predetermined reference parameter value; and an overvoltage response circuit arranged to initiate a course of action such as latching or shutting down the switching power supply to which the OVP circuit is coupled when the logic circuitry's first output toggles.

In a preferred embodiment, the logic circuitry is further arranged to toggle a second output when the output of the bus voltage overvoltage detection circuit indicates that the voltage on the common power bus exceeds the predetermined reference voltage, but that the output of the modulation flag detection circuit indicates that the parameter value does not exceed the predetermined reference parameter value. Then, a second overvoltage response circuit is arranged to initiate a second course of action—such as temporarily disable the PWM or PFM drive signals for the switching power supply to which the OVP circuit is coupled—when the logic circuitry's second output toggles.

These and other features, aspects, and advantages of the present invention will become better understood with reference to the following description and claims.

DETAILED DESCRIPTION OF THE INVENTION

Figure 2:
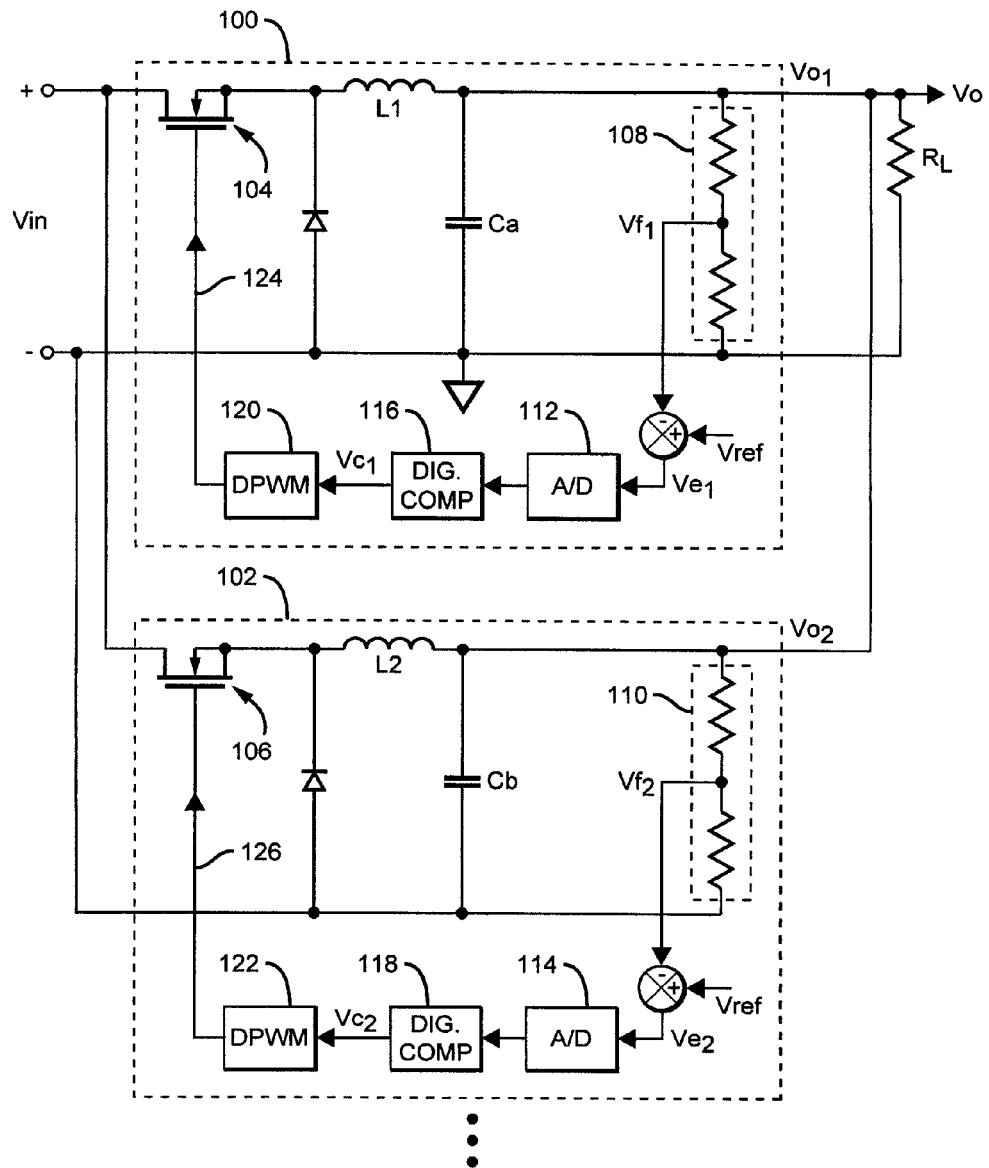
FIG. 2 is a block/schematic diagram of a power system which includes multiple parallel-connected switching power supplies.

The present system is for use with multiple parallel-connected switching power supplies; a simplified diagram of one possible configuration of two such power supplies is shown in FIG. 2. Each power supply 100,102 includes at least one switching transistor 104, 106 which is switched on and off to control the current in an inductor (L1, L2) and a capacitor (Ca, Cb) and thereby transfer a DC input voltage (Vin) to a DC output voltage ($Vo_x$). All of the output voltages are connected together to form a common bus output voltage Vo capable of driving a load (represented by resistance $R_l$). Output voltage Vo is regulated with an analog or digital closed loop control scheme; a digital control scheme is assumed in the discussion below.

Output voltage Vo is sensed, typically using a voltage divider 108, 110, and the voltages ($Vf_1$, $Vf_2$) are compared with a reference voltage Vref to produce respective error voltages $Ve_x$. The error voltages are digitized with respective A/D converters 112, 114, the digital outputs of which are fed to respective digital compensator circuits 116, 118. The compensator circuits output respective compensated error signals $Vc_x$, which are provided to digital pulse width modulator (DPWM) circuits 120, 122 which generate the PWM signals 126 that drive the switching transistor(s). When so arranged, a closed loop is formed which enables Vo to be regulated. Additional power supplies (not shown) would be connected in parallel with power supplies 100 and 102.

Figure 1:
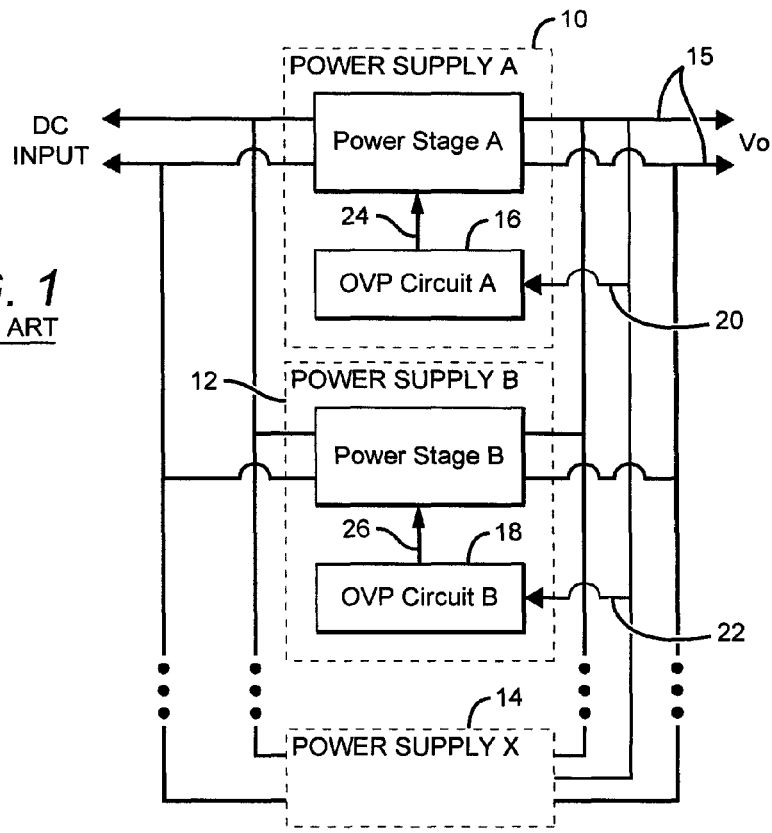
FIG. 1 is a block diagram of a conventional power system which includes multiple parallel-connected switching power supplies.
Figure 3:
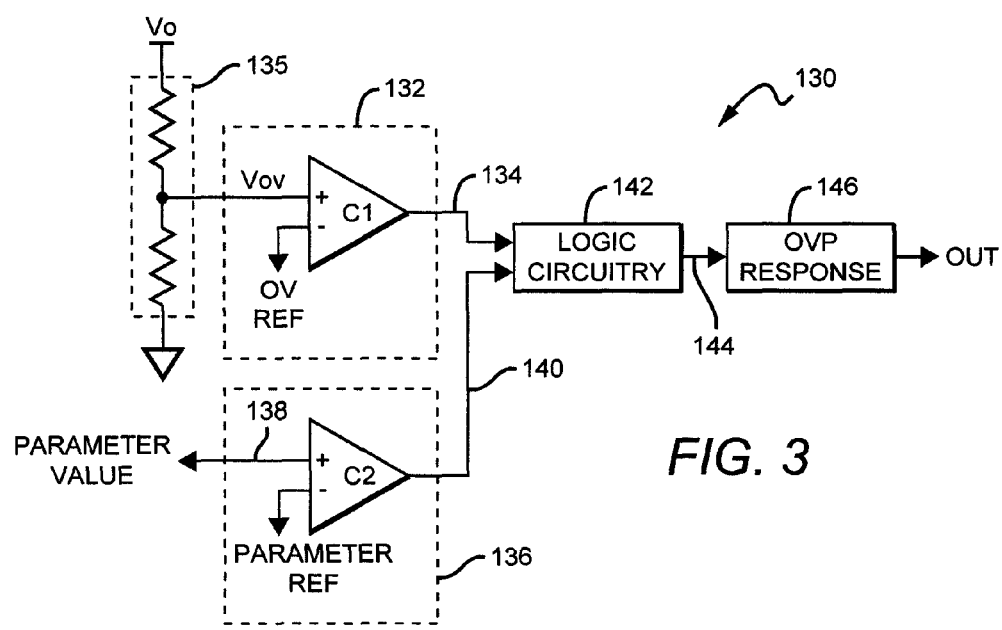
FIG. 3 is a block/schematic diagram of one possible embodiment of an OVP circuit in accordance with the present invention.

Having described the basic configuration and operation of switching power supplies of the sort that might be used with the present OVP system, the present OVP system is now discussed. The OVP system consists of multiple OVP circuits, each of which is coupled to a respective switching power supply. A block diagram of one possible embodiment of an OVP circuit 130 per the present invention is shown in FIG. 3; for purposes of illustration, assume that OVP circuit 130 is coupled to switching power supply 100 in FIG. 1.

OVP circuit 130 includes a bus voltage overvoltage detection circuit 132 having an output 134 which toggles when a voltage ($V_{ov}$) representative of common bus voltage Vo exceeds a predetermined reference voltage (OV REF). $V_{ov}$ may be generated with, for example, a voltage divider 135, and output 134 might be generated with, for example, a comparator C1. OVP circuit 130 also includes a modulation flag detection circuit 136 which receives a value 138 that varies with a parameter associated with the PWM or PFM drive signals generated for switching power supply 100, and has an output 140 which toggles when the parameter value exceeds a predetermined reference parameter value PARAMETER REF; output 140 might be generated with, for example, a comparator C2. Logic circuitry 142 receives the outputs of bus voltage overvoltage detection circuit 132 and modulation flag detection circuit 136 at respective inputs, and is arranged to toggle a first output 144 when the output of the bus voltage overvoltage detection circuit indicates that $V_{ov}$ exceeds predetermined reference voltage OV REF and the output of the modulation flag detection circuit indicates that the parameter value exceeds predetermined reference parameter value PARAMETER REF. In addition, OVP circuit 130 includes a first overvoltage response circuit 146, arranged to initiate a first course of action for switching power supply 100 when the logic circuitry's first output 144 toggles to indicate a fault.

In one mode of operation, OVP circuit 130 triggers overvoltage response circuit 146 when 1) the voltage $V_{ov}$ representative of the common bus voltage exceeds OV REF, that the voltage on the common bus is too high, and 2) the parameter associated with the or PFM drive signals exceeds PARAMETER REF, which indicates that the control loop for switching power supply 100 is improperly trying to increase the power supply's output The parameter value exceeding PARAMETER REF would typically occur if there is a failure associated with the feedback voltage $Vf_1$, such that $Vf_1$ is not accurately reflecting bus Vo but is instead returning 0 volts to the control loop for power supply 100. This might if, for example, one of the components making up voltage divider 108 failed; for example one or the other of the divider resistors may become shorted, or be open. This type of fault causes the control loop of power supply 100 to increase the parameter value as high as possible in an attempt to regulate the bus voltage; as a result, both the bus voltage and the parameter value exceed their predetermined limits—which is the condition that the present OVP circuit is intended to detect and manage. Note that other failure-types might also cause the parameter associated with the PWM or PFM drive signals to exceed the reference value; for example, abnormal operation of the control loop or an incorrect reference value might also have this effect.

Overvoltage response circuit 146 might be arranged such that the first course of action to be taken when triggered by the toggling of logic circuitry output 144 might be to latch the switching power supply to which the OVP circuit is coupled (here, power supply 100) in a shutdown state until externally reset. This would enable a user to swap out the faulty power supply if desired. Alternatively, the first course of action might be to shut down the switching power supply for a predetermined amount of time, after which the power supply is restarted.

As noted above, modulation flag detection circuit 136 receives a parameter (typically called a 'modulation value') associated with the PWM or PFM drive signals generated for switching power supply 100. Several possible parameters might be used. For example, one possible parameter that could be provided to modulation flag detection circuit 136 is 'modulated pulse duration'. When the switching power supply is regulated using PWM signals, these signals are modulated with an associated modulated pulse duration. The modulated pulse duration for a given switching power supply given by:

Tm=Tsw*Dm, where Tm is the power supply's modulated pulse duration, Tsw is the power supply's switching period and Dm is the power supply's duty cycle. Modulated pulse is preferably a digital value; referring back to FIG. 2, the modulated pulse duration is the compensated error signal $Vc_1$ produced by digital compensator circuit 116. This value will increase if, for example, there is a failure associated with the feedback voltage $Vf_1$, such that $Vf_1$ is not accurately reflecting bus voltage Vo. In this case, the PARAMETER REF value be a reference modulated pulse duration, and output 140 will toggle when the modulated duration exceeds the reference modulated pulse duration.

In some instances, a switching power supply such as that depicted in FIG. 2 will have an associated modulated pulse duration limit. In such a case, the present OVP system can be arranged such that the predetermined reference modulated pulse duration (PARAMETER REF) is slightly less than the modulated pulse duration limit.

When power supply 100 is regulated using PWM signals, another parameter that might be used by modulation flag detection circuit 136 is the duty cycle of the PWM drive signals. As with modulated pulse duration, PWM duty cycle will increase if, for example, there is a failure associated with the feedback voltage $Vf_1$, such that $Vf_1$ is not accurately reflecting bus voltage Vo. In this case, the PARAMETER REF value will be a reference duty cycle value. In the event that power supply 100 has an associated duty cycle limit value, the predetermined reference duty cycle value might be selected to be slightly less than the duty cycle limit value.

The present OVP system can be used with many different switching power supply topologies and types. For example, the OVP system could be used with non-isolated topologies, such as buck, boost or buck-boost type converters. It can also be used with isolated topologies, and with phase-shift full bridge power supplies. Note that, for a conventional PWM-based switching power supply, the 'modulated pulse duration' affects the position of the rising or falling edges of the drive pulses with respect to a default position, such that the modulated pulse duration affects the pulse width. However, for a phase-shift full bridge power supply, the modulated pulse duration affects the position of both the rising and falling edges of the drives pulses with respect to a default position, such that the pulse width remains constant.

The present OVP system can also be used with resonant power supplies. This type of power supply uses pulsed frequency modulation (PFM) rather than PWM to regulate output voltage. When so arranged, the PFM drive signals will have an associated switching cycle value, and the switching cycle value can be the parameter monitored by modulation flag detection circuit 136. In this case, the PARAMETER REF value will be a reference switching cycle value. As with modulated pulse duration and duty cycle, a resonant power supply may have an associated switching cycle limit value. For some types of converters, such as series resonant converters, the switching cycle will go to a maximum switching cycle value if there a failure associated with the feedback voltage $Vf_1$. In this case, the OVP system can be arranged such that the predetermined reference switching cycle value is slightly less than the switching cycle high limit value. For other types of converters, such as parallel resonant converters, the switching cycle will go to a minimum switching cycle if there is a failure associated with the feedback voltage $Vf_1$. In this case, the OVP system can be arranged such that the predetermined reference switching cycle value is slightly larger than the switching cycle low limit value.

One or more components of OVP circuit 130 may be programmable. For example, bus voltage overvoltage detection circuit 132, modulation flag detection circuit 134, and/or overvoltage response circuit 146 may be made programmable, by, for example, enabling the predetermined reference voltage, the predetermined reference parameter value, and/or the first course of action, respectively, to be programmable.

Figure 4:
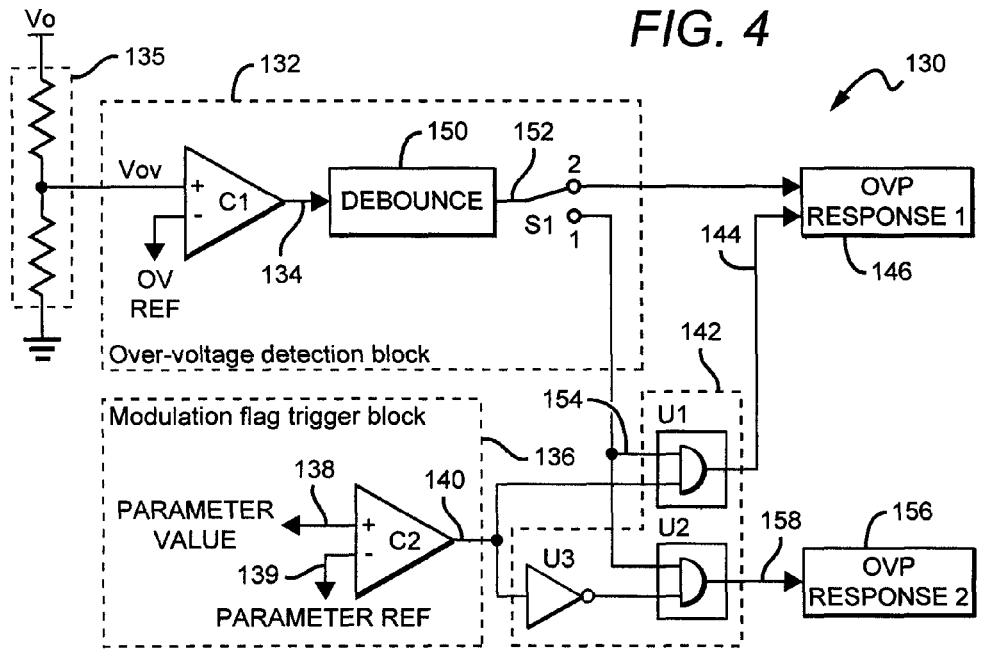
FIG. 4 is a block/schematic diagram of another possible embodiment of an OVP circuit in accordance with the present invention.

A preferred embodiment of OVP circuit 130 is shown in FIG. 4. Here, bus voltage overvoltage detection circuit 132 comprises comparator C1, which receives a voltage $V_{ov}$ that varies with the voltage on the common power bus at a first input and predetermined reference voltage OV REF at a second input, and which toggles its 134 when the voltage on the first input exceeds the voltage on the second input. Comparator C1 might be an analog comparator, but is preferably implemented digitally. A digital configuration (not shown) might include an analog-to-digital converter (ADC) which receives $V_{ov}$ at its analog input and produces a digital output, and a digital comparator which receives the digital output from the ADC and a digital value which represents reference voltage OV REF at first and second inputs, and is arranged to toggle its output when the digital value on the first input exceeds the digital value on the second input.

Circuit 132 may also include a debounce circuit 150 coupled to receive and filter from comparator output 134 to produce a filtered signal 152. A switch S1 might also be interposed between output 134 (or, if debounce circuit 150 is used, 152) and the logic circuitry's bus voltage overvoltage detection circuit input (154). S1 is arranged such that 134 (or 152) is connected to logic circuitry input 154 when in a first position (1), and is coupled to overvoltage response circuit 146 when in a second position (2). Switch S1 would placed in the second position if an OVP response based solely on the detection of an overvoltage condition on the common bus voltage is desired. When so configured, response circuit 146 would be further arranged to initiate a course of action for the switching power supply (100) to which OVP circuit 130 is coupled when the switch is in the second position and output 134 (or 152) toggles. The OVP system may be arranged such that the debounce time and the functionality of switch S1 are programmable.

With S1 in the second position, one possible course of action when overvoltage response circuit 146 is triggered would be to latch switching power supply 100 in a shutdown state until externally reset. Another possible course of action would be to shut down switching power supply 100 for a predetermined amount of time, after which the power supply is restarted.

Modulation flag detection circuit 136 preferably comprises a digital comparator C2 which receives a digital representation of the parameter value (such as the modulated pulse duration, duty cycle or switching cycle value) at a first input 138, and a digital value which represents the predetermined reference parameter value (e.g., PARAMETER REF) at a second input 139, with the digital comparator arranged to toggle its output 140 when the digital value on its first input exceeds the digital value on its second input.

Overvoltage response circuit 146 is arranged to take action in the event that the switching power supply to which OVP circuit 130 is coupled has experienced a failure. OVP circuit 130 may also include a second overvoltage response circuit 156 which is arranged to initiate an action when the power supply to which OVP circuit 130 is coupled is functioning normally, but one of the other parallel-connected power supplies has a fault. Here, logic circuitry 142 is further arranged to toggle a second output 158 when the output of bus voltage overvoltage detection circuit 132 indicates that voltage $V_{ov}$ exceeds predetermined reference voltage OV REF, but the output of modulation flag detection circuit 136 indicates that parameter value 138 does not exceed the predetermined reference parameter value—that the power supply to which OVP circuit 130 is coupled is operating normally. In other words, output 158 toggles when an overvoltage condition is detected on the common power bus, but the parameter associated with the PWM or PFM drive signals generated for the switching power supply to which OVP circuit 130 is coupled (power supply 100 in this example) is at a 'normal' value. Second overvoltage response circuit 156 can be arranged to initiate a second course of action for switching power supply 100 when second output 158 toggles. The 'second course of action' taken by second overvoltage response circuit 156 may be to, for example, continue the operation of switching power supply 100 without Another possible second course of action might be to temporarily disable the PWM or PFM drive signals for switching power supply 100 until voltage $V_{ov}$ falls below OV REF.

The logic circuitry may be implemented in many different ways. One possible implementation comprises first and second AND gates U1 and U2. AND gate U1 receives the output of bus voltage overvoltage detection circuit 132 (134 or 152, assuming the switch S1 is in the first position) and the output 140 of modulation flag detection circuit 136 at respective inputs and produces first logic circuitry output 144, which toggles when the outputs of both circuits 132 and 136 indicate a fault. AND gate U2 receives the output of bus voltage overvoltage detection circuit 132 and the inverse of the output of modulation flag detection circuit 136 at respective inputs and produces second logic circuitry output 158, which toggles when the outputs of circuit 132 indicates a fault, but circuit 136 does not. As shown in FIG. 4, an inverter U3 might be used to provide the inverse of the output of modulation flag detection circuit 136.

Figure 5:
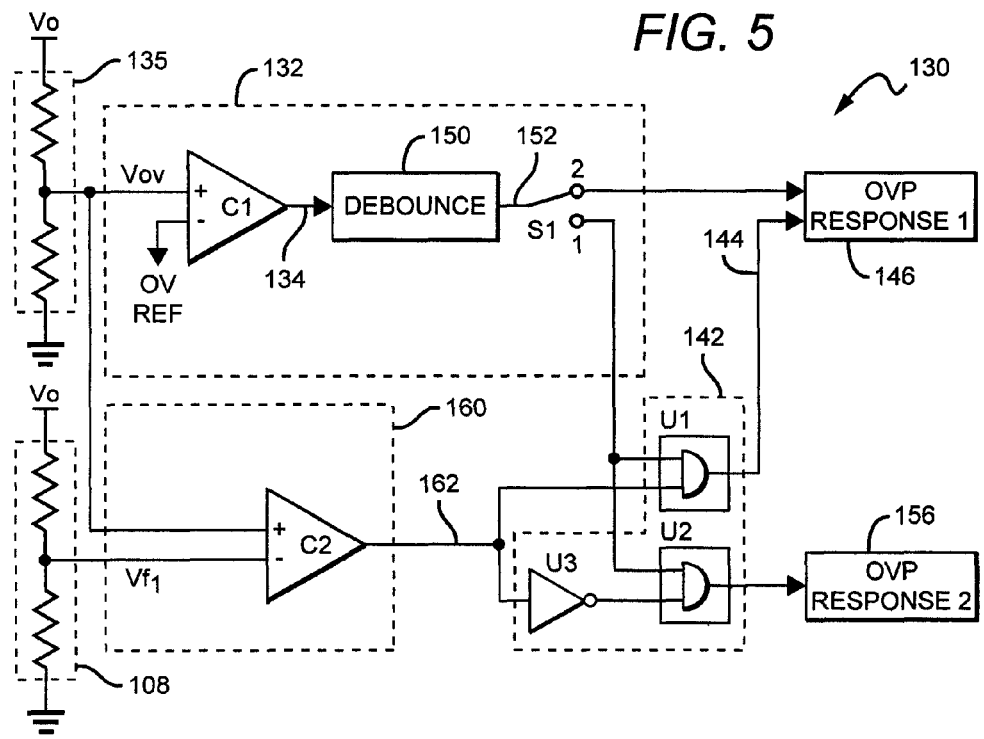
FIG. 5 is a block/schematic diagram of another possible embodiment of an OVP circuit in accordance with the present invention.

An 'open loop' condition would occur if there is a failure associated with the feedback voltage received by a particular switching power supply. For example, referring back to FIG. an open loop condition would be present if feedback voltage $Vf_1$ did not vary with Vo. The present OVP system can be configured to detect such an open loop condition. For this configuration, an exemplary embodiment of which is shown in FIG. 5, bus voltage detection circuit 132 is as before, having an output 134 which toggles when the voltage $V_{ov}$ representing the common bus voltage—generated, for example, with a resistor divider 135—exceeds predetermined reference voltage OV REF. Here, however, an open loop detection circuit 160 receives voltage $V_{ov}$ at a first input and a voltage such as feedback voltage $Vf_1$—generated, for example, by a divider 108—at a second input, and has an output 162 which toggles when the voltage on the first input exceeds the voltage on the second input. The resistors of dividers 135 and 108 are preferably identical. As such, when operating normally, $V_{ov}$ and $Vf_1$ should be nearly equal, such that output 162—suitably provided by a comparator circuit C2—does not toggle. However, in the event of an open loop condition, there should be large difference between $V_{ov}$ and $Vf_1$, sufficient to cause output 162 to toggle and thereby indicate an open loop failure.

Logic circuitry 142 is as before, connected to receive the outputs of bus voltage overvoltage detection circuit 132 and open loop detection circuit 160 at respective inputs, and to toggle first output 144 when the output of bus voltage overvoltage detection circuit 132 indicates that $V_{ov}$ exceeds OV REF and the output of open loop detection circuit 160 indicates that an open loop fault has occurred. First overvoltage response circuit 146 is triggered by output 144 as before, and arranged to initiate a first course of action for the switching power supply to which OVP circuit 130 is coupled when so triggered.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. An overvoltage protection (OVP) system for a power system which includes multiple switching power supplies having their output voltages connected to a common power bus, comprising:
    a plurality of OVP circuits adapted for coupling to respective switching power supplies, each of which has one or more switching elements that are driven with respective pulse-width-modulated (PWM) or pulse-frequency-modulated (PFM) drive signals generated by a control circuit which varies said drive signals as needed to regulate an output voltage, the output voltages of said switching power supplies connected to a common power bus, each of said OVP circuits comprising:
        a bus voltage overvoltage detection circuit having an output which toggles when the voltage on said common power bus exceeds a predetermined reference voltage;
        a modulation flag detection circuit which receives a value that varies with a parameter associated with the PWM or PFM drive signals generated for the switching power supply to which said OVP circuit is coupled, and has an output which toggles when said parameter value exceeds a predetermined reference parameter value;
        logic circuitry which receives the outputs of said bus voltage overvoltage detection circuit and said modulation flag detection circuit at respective inputs and is arranged to toggle a first output when the output of said bus voltage overvoltage detection circuit indicates that the voltage on said common power bus exceeds said predetermined reference voltage and the output of said modulation flag detection circuit indicates that said parameter value exceeds said predetermined reference parameter value; and a first overvoltage response circuit arranged to initiate a first course of action for the switching power supply to which said OVP circuit is coupled when said logic circuitry's first output toggles.

2. The system of claim 1, wherein said first course of action is to latch the switching power supply to which said OVP circuit is coupled in a shutdown state until externally reset.

3. The system of claim 1, wherein said first course of action is to shut down the switching power supply to which said OVP circuit is coupled for a predetermined amount of time and then restart said switching power supply.

4. The system of claim 1, wherein said logic circuitry is further arranged to toggle a second output when the output of said bus voltage overvoltage detection circuit indicates that the voltage on said common power bus exceeds said predetermined reference voltage but the output of said modulation flag detection circuit indicates that said parameter value does not exceed said predetermined reference parameter value, further comprising a second overvoltage response circuit arranged to initiate a second course of action for the switching power supply to which said OVP circuit is coupled when said logic circuitry's second output toggles.

5. The system of claim 4, wherein said second course of action is to continue the operation of the switching power supply to which said OVP circuit is coupled without interruption.

6. The system of claim 4, wherein said second course of action is to disable the PWM or PFM drive signals for the switching power supply to which said OVP circuit is coupled until the voltage on said common power bus falls below said predetermined reference voltage.

7. The system of claim 4, wherein said logic circuitry comprises first and second AND gates, said first AND gate receiving the output of said bus voltage overvoltage detection circuit and the output of said modulation flag detection circuit at respective inputs and producing said first logic circuitry output, said second AND gate receiving the output of said bus voltage overvoltage detection circuit and the inverse of said output of said modulation flag detection circuit at respective inputs and producing said second logic circuitry output.

8. The system of claim 1, wherein one or more of said bus voltage overvoltage detection circuit, said modulation flag detection circuit, and said first overvoltage response circuit are programmable.

9. The system of claim 8, wherein one or more of said predetermined reference voltage, said predetermined reference parameter value, and said first course of action are programmable.

10. The system of claim 1, wherein said switching power supplies are phase-shift full bridge power supplies.

11. The system of claim 1, wherein said switching power supplies are either isolated or non-isolated power supplies.

12. The system of claim 1, further comprising a switch interposed between the output of said bus voltage overvoltage detection circuit and said logic circuitry's bus voltage overvoltage detection circuit input, said switch arranged such that the output of said bus voltage overvoltage detection circuit is connected to said logic circuitry's bus voltage overvoltage detection circuit input when said switch is in a first position, and is directly coupled to said first overvoltage response circuit when said switch is in a second position, said first overvoltage response circuit arranged to initiate a second course of action for the switching power supply to which said OVP circuit is coupled when said switch is in said second position and the output of said bus voltage overvoltage detection circuit toggles.

13. The system of claim 12, wherein said second course of action is to latch the switching power supply to which said OVP circuit is coupled in a shutdown state until externally reset.

14. The system of claim 12, wherein said course of action is to shut down the switching power supply to which said OVP circuit is coupled for a predetermined amount of time and then restart said switching power supply.

15. The system of claim 12, wherein the functionality of said switch is programmable.

16. The system of claim 1, wherein said PWM drive signals are modulated with an associated modulated pulse duration to regulate said output voltage;
wherein said parameter associated with the PWM drive signals generated for the switching power supply to which said OVP circuit is coupled is said power supply's modulated pulse duration; and
wherein the output of said modulation flag detection circuit toggles when the modulated pulse duration associated with the switching power supply to which said OVP circuit is coupled exceeds a predetermined reference modulated pulse duration.

17. The system of claim 16, wherein said switching power supplies have an associated modulated pulse duration limit, said system arranged such that said predetermined reference modulated pulse duration is less than said modulated pulse duration limit.

18. The system of claim 16, wherein each of said switching power supplies has an associated switching period Tsw and a duty cycle Dm, said modulated pulse duration for a given switching power supply given by Tm=Tsw*Dm, where Tm is said power supply's modulated pulse duration, Tsw is said power supply's switching period and Dm is said power supply's duty cycle.

19. The system of claim 1, wherein said PWM drive signals have an associated duty cycle;
wherein said parameter associated with the PWM drive signals generated for the switching power supply to which said OVP circuit is coupled is said power supply's duty cycle; and
wherein the output of said modulation flag detection circuit toggles when the duty cycle associated with the switching power supply to which said OVP circuit is coupled exceeds a predetermined reference duty cycle value.

20. The system of claim 19, wherein said switching power supplies have an associated duty cycle limit value, said system arranged such that said predetermined reference duty cycle value is less than said duty cycle limit value.

21. The system of claim 1, wherein said switching said PFM drive signals have an associated switching cycle value;
wherein said parameter associated with the PFM drive signals generated for the switching power supply to which said OVP circuit is coupled is said power supply's switching cycle value; and
wherein the output of said modulation flag detection circuit toggles when the switching cycle value associated with the switching power supply to which said OVP circuit is coupled exceeds a predetermined reference switching cycle value.

22. The system of claim 21, wherein said switching power supplies have an associated switching cycle limit value, said system arranged such that said predetermined reference switching cycle value is less than said switching cycle limit value.

23. The system of claim 21, wherein said switching power supplies are series resonant power supplies.

24. The system of claim 1, wherein said switching power supplies are parallel resonant converters and said PFM drive signals have an associated switching cycle value;
wherein said parameter associated with the PFM drive signals generated for the parallel resonant converter to which said OVP circuit is coupled is said parallel resonant converter's switching cycle value; and
wherein the output of said modulation flag detection circuit toggles when the switching cycle value associated with the parallel resonant converter to which said OVP circuit is coupled falls to less than a predetermined reference switching cycle value.

25. The system of claim 24, wherein said parallel resonant converters have an associated switching cycle limit value, said system arranged such that said predetermined reference switching cycle value is greater than said switching cycle limit value.

26. The system of claim 1, wherein said bus voltage overvoltage detection circuit comprises a comparator which receives a voltage that varies with the voltage on said common power bus at a first input and said predetermined reference voltage at a second input, said comparator arranged to toggle an output when the voltage on said first input exceeds the voltage on said second input.

27. The system of claim 26, further comprising a debounce circuit coupled to receive said comparator output and arranged to filter noise from said output, said filtered signal being said bus voltage overvoltage detection circuit's output.

28. The system of claim 27, wherein said debounce circuit has an associated debounce time, said debounce time being programmable.

29. The system of claim 1, wherein said bus voltage overvoltage detection circuit comprises:
an analog-to-digital converter (ADC) which receives a voltage that varies with the voltage on said common power bus at its analog input; and
a digital comparator which receives the digital output of said ADC at a first input and a digital value which represents said predetermined reference voltage at a second input, said digital comparator arranged to toggle an output when the digital value on said first input exceeds the digital value on said second input.

30. The system of claim 1, wherein said a modulation flag detection circuit comprises a digital comparator which receives a digital representation of said parameter value at a first input and a digital value which represents said predetermined reference parameter value at a second input, said digital comparator arranged to toggle an output when the digital value on said first input exceeds the digital value on said second input.

31. An overvoltage protection (OVP) system for a power system which includes multiple switching power supplies having their output voltages connected to a common power bus, comprising:
a plurality of OVP circuits adapted for coupling to respective switching power supplies, each of which has one or more switching elements that are driven with respective pulse-width-modulated (PWM) or pulse-frequency-modulated (PFM) drive signals generated by a control circuit which varies said drive signals as needed to regulate an output voltage, the output voltages of said switching power supplies connected to a common power bus, said control circuit receiving a feedback voltage which varies with the voltage on said common power bus when operating normally, each of said OVP circuits comprising:

a bus voltage overvoltage detection circuit having an output which toggles when the voltage on said common power bus exceeds a predetermined reference voltage;

an open loop detection circuit which receives a value that varies with the voltage on said common power bus at a first input and a value that varies with said feedback voltage at a second input, and has an output which toggles when the difference between the voltages on said first and second inputs indicates that said feedback voltage is not varying with the voltage on said common power bus;

logic circuitry which receives the outputs of said bus voltage overvoltage detection circuit and said open loop detection circuit at respective inputs and is arranged to toggle an output when both of said outputs toggle; and a first overvoltage response circuit arranged to initiate a first course of action for the switching power supply to which said OVP circuit is coupled when said logic circuitry's output toggles.

\* \* \* \* \*